United States Patent Office 3,208,985
Patented Sept. 28, 1965

3,208,985
OLEFIN POLYMERIZATION WITH A HEAVY METAL COMPOUND - ORGANOHYDROGEN SILOXANE CATALYST
Gottfried Piekarski, Eduard Enk, Siegfried Nitzsche, and Herbert Reinecke, all of Burghausen, Upper Bavaria, Germany, assignors to Wacker-Chemie G.m.b.H., Munich, Bavaria, Germany
No Drawing. Filed Dec. 1, 1958, Ser. No. 777,181
Claims priority, application Germany, Dec. 11, 1957, W 22,396
29 Claims. (Cl. 260—92.8)

This invention relates to novel polymerization catalysts and a method of polymerizing unsaturated organic compounds.

The polymerization of alpha-olefins and other vinylic type compounds has been the subject of much research and extensive publication. It is known that certain olefins and other vinylic compounds can be polymerized to high molecular weight materials by various means.

One commercial method of preparing such polymers involves heating the monomer at temperatures up to 200° C. and pressures up to 100 atmospheres in the presence of certain organic solvents such as gasoline, diesel oil and aromatic hydrocarbons and employing a catalyst prepared by mixing (component A) a metal or compound of elements of the group IA, IIA, IIIA and IVA of the periodic chart of the elements and (component B) of a compound of a metal in the subgroups IVB, VB and VIB of the periodic chart. Well known and widely employed as component A are organometallic compounds particularly alkyl compounds of aluminum, magnesium, zinc, tin, lead, sodium, potassium and other alkali metals. Illustrative of the components B are compounds of titanium, zirconium, hafnium, thorium, vanadium, niobium, tantalum, chromium, molybdenum, tungsten and uranium. It is known that mixtures of components A and B suffer from certain disadvantages such as extreme toxicity, flammability, and difficulty in preparation of the ultimate catalyst.

It is an object of this invention to prepare novel polymerization catalysts. Another object is to introduce a new method for polymerizing olefinic compounds. A further object is to prepare an inexpensive, easily produced polymerization catalyst having effectiveness over a wide area of olefinic monomers. Other objects and advantages of this invention are detailed in or will be apparent from the disclosure and claims which follow.

This invention is concerned with a very active polymerization catalyst for olefinic compounds which comprises a product prepared by mixing (A) hydrogen substituted siloxane polymers and (B) compounds of metals of groups IVB through VIB of the periodic chart of the elements. This catalyst system is employed in the absence of moisture and air. This catalyst system is particularly useful for the preparation of high polymers and copolymers of unsaturated organic compounds and specifically for preparing high polymers and copolymers of the olefins such as ethylene and other polymerizable monomers or mixtures of monomers containing polymerizable ethylene groups.

The hydrogen siloxane polymer contains units of the formula

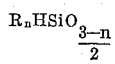

wherein $n$ has a value of 0, 1 or 2 and each R is a hydrogen atom; an alkyl radical such as methyl, ethyl, propyl and octadecyl; a cycloalkyl radical such as cyclopentyl and cyclooctyl; an aryl radical such as phenyl and anthracyl, an alkoxy radical; a cycloalkoxy radical; an aryloxy radical; or a substituted product of any or organic radicals in the foregoing list, such as the chlorophenyl or tolyl radical.

The operative hydrogensilicon compounds can be organohydrogensiloxane polymers and copolymers of the unit formula

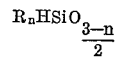

The siloxane can be a homopolymer of repeating identical units such as a methylhydrogensiloxane polymer. The siloxane can be a copolymer such as 80 mol percent methylhydrogensiloxane units, 15 mol percent phenylhydrogensiloxane units, 3 mol percent methoxyhydrogensiloxane units, 1.5 mol percent cyclopentylhydrogensiloxane units and 0.5 mol percent dimethylhydrogensiloxane units. Other units can be present and an illustrative list includes 3,3,3-trifluoropropylhydrogensiloxane units, methylphenylhydrogensiloxane units, octadecylhydrogensiloxane units, cyclooctylhydrogensiloxane units, ethoxymethylhydrogensiloxane units, chlorophenylhydrogensiloxane units, iodimethylhydrogensiloxane units, dibromophenylhydrogensiloxane units and so forth. Mixtures of homopolymers, copolymers, or both are operative herein. Small amounts of up to 20 mol percent of units containing no silicon-bonded hydrogen will not disturb.

The second ingredient in the catalyst system is a compound of a metal in the groups IVB, VB and VIB of the periodic chart. Examples of operative compounds include halides such as titanium tetrachloride, zirconium tetrachloride, vanadium tetrachloride, chromium tetrachloride, molybdenum pentachloride, and hafnium tetrachloride, as well as the corresponding fluorides, bromides and iodides of these metals; oxyhalides such as zirconium oxychloride, vanadium oxychloride and chromium oxychloride; esters such as -butylates, -n-octylates, -cyclo-hexylates, -butenylates, -2-cyclohexenylates, -hexylates, and -2-phenylethylates, of metals such as Ti, Zr, V, Cr, Mo and U; salts with organic acids, such as those prepared by reacting titanium esters with acetic anhydride, zirconium tetraacetate, titanium dichlorodiacetate; acetylacetonates such as zirconium, thorium and chromium acetylacetonate; and metallic-organic salts such as dichloro-bis(cyclopentadienyl) compounds of titanium, zirconium and vanadium. Single compounds or mixtures of compounds can be employed.

The catalysts are easily prepared. It is necessary that at least 0.5 mol of RHSi= units be present for each mol of the metal compound. It is preferred to use an excess of the RHSi= material. The RHSi= material and metal compound are dissolved or suspended in a substantially anhydrous inert solvent such as gasoline and are de-aerated and heated in the reaction vessel wherein the ultimate polymerization is to be carried forward. The mixture of components A and B in solvent is heated to between 60° and 150° C., preferably between 90° to 110° C. for 1 to 2 hours. The catalysts are obtained in heterogeneous phase or in solution.

The catalyst preparation described above can be accelerated, the hydrogen silicon compound can be used more efficiently and the yield of catalyst can be increased by adding a small amount of a hydrogen donator [i.e. an organic compound containing "active hydrogen" as determined by the Zerewitinoff reaction], such as substantially anhydrous aliphatic alcohols, for example, methyl alcohol, to the mixture before heating. The hydrogen donator can be present in quantities up to 20% by weight of the component B.

The preceding description relates primarily to the preparation of the catalyst preceding the polymerization reaction. However, it is contemplated and is specifically within the scope of this invention that the catalyst components plus monomers or monomeric mixtures to be polymerized can be placed in the reaction zone and catalyst preparation and polymerization of monomer can occur concurrently. This method is particularly adapted to a continuous polymerization process wherein fresher catalyst components and monomer are continuously fed into a reaction zone and polymer and exhausted catalyst are removed therefrom.

Satisfactory polymerization is achieved with the catalysts outlined above. However, further activation of the hydrogen siloxane polymer may be obtained and the polymerization rate can be accelerated by adding thereto 0.001 to 100 percent, calculated on the weight of compound B, of a compound selected from low valency compounds of metals from groups IVB, VB and VIB of the periodic chart and of Friedel-Crafts catalysts such as $TiCl_3$, $TiCl_2$, $VCl_3$, $CrCl_2$, $AlCl_3$ and $ZnCl_2$, to the mixture of components A and B before heating. Furthermore, the addition of an equal weight of component B to the already prepared catalyst mass followed immediately by initiation of the polymerization, will produce improved space-time-yield of product.

This polymerization method is generally applicable to olefins and other vinylic type monomers. Thus one can polymerize and copolymerize via this method such olefins as ethylene, propylene, butene-1, hexene-1, heptene-1, octene-1, and isobutylene, as well as aliphatic olefin derivatives such as vinyl chloride, vinyl acetate, and arcylic derivatives, such as acrylonitrile. This method is also operative with vinyl aromatic compounds such as styrene and its derivatives.

The polymerization reaction is carried out by merely contacting the monomer with the catalyst system. Pressures of 1 to 100 atmospheres and temperatures of 30° to 200° C. can be employed. Superior results have been achieved with pressures of 10 to 50 atmospheres and temperatures of 65° to 130° C.

The polymeric materials obtained through this invention can be separated from the reaction mass and purified by methods well known in the art. When the polymerization reaction is carried out at pressures of 10 atmospheres or more, the polymeric product can be subjected to mechanical comminution in an alcoholic suspension, after separation from the solvent. However, if the reaction pressure is less than 10 atmospheres, the polymer will be pulverulent and particularly easy to remove from the catalyst residues.

The polymeric products obtained through this invention exhibit peculiar linear structure which becomes evident from the high softening and melting points of the polymers. The ash content of the purified polymers is exceedingly low being less than 0.1% and generally being between 0.04% and 0.06%.

The following examples are included herein to aid those skilled in the art to better understand and practice this invention. The examples do not delineate the scope of the invention. All parts and percentages in the examples are based on weight. All viscosities are measured at 25° C.

EXAMPLE 1

A one-liter autoclave of stainless steel with a magnetic stirring apparatus was employed and 12.5 cc. of dried deaerated methyl hydrogen polysiloxane (viscosity of 30 cs.), 1.25 g. of $TiCl_4$, and 340 cc. of dried, deaerated benzine (boiling range 150° to 180° C.) were placed therein under dry nitrogen. The mixture was heated in the closed autoclave for 1.5 hours at 105° C. under autogenous pressure. Ethylene was then forced into the autoclave at a pressure of 40 atmospheres. The polymerization was carried out over a period of 30 hours at a temperature of 150° C. and a pressure of 52 atmospheres with additional quantities of ethylene forced into the reaction zone from time to time. The reaction mass was cooled to 20° C. and the excess ethylene was released. The product was a reddish-brown gelatinous mass which was easily removed from the autoclave. The reddish-brown color dissipated as the polyethylene was exposed to the air. The polymeric product was separated from the solvent by filtration. The polymeric product was further purified by washing with methanol, boiling at reflux for 1 hour with a 1/1 mixture of 10% nitric acid/methanol and thereafter neutralizing with methanol and water. The product was dried at 85° C. and 20 g. of a white, high molecular weight polymeric product was obtained. No low molecular weight components could be detected even by the use of boiling acetone. The fusion point was determined by the extinguishment of the double refraction upon observation under a polarizing microscope and was found to be 124° C.

EXAMPLE 2

The method of Example 1 was followed but 10 cc. of a 10 percent solids $TiCl_3/TiCl_2$ (ratio of 5.4/1) suspension in gasoline was added to the catalyst mixture before heating. The ethylene was applied at 24 atmospheres and reaction was carried forward at 123° to 134° C. and 39 atmospheres for 24 hours. The product was a solid gray polyethylene which was purified to 32 g. of a white, very high molecular weight product having a fusion point of 136° C. and an ash content of less than 0.1%.

The above procedure was repeated but the methyl hydrogen siloxane was omitted. The polymeric product was obtained but the yield was only about 3% of the yield achieved with the methylhydrogensiloxane as a part of the catalyst system.

EXAMPLE 3

The method of Example 2 was repeated with 1 g. of sublimated, finely divided $AlCl_3$ in place of the low valency titanium chlorides mixture. The ethylene was applied for 2 hours at 105° C. and at a pressure of up to 47 atmospheres. The reaction was carried forward at 125° C. and 50 atmospheres for 18 hours. The raw product was a reddish-brown material which was separated and purified as before. The solid polyethylene product obtained in a yield of 34 g. had a fusion point of 130° C.

The above procedure was repeated but without methylhydrogenpolysiloxane and no solid product was obtained.

EXAMPLE 4

The method of Example 2 was followed to prepare the catalyst. A solution of 1.25 g. of $TiCl_4$ dissolved in 15 cc. of benzine was added to the catalyst mass at 100° C. Ethylene was added to the autoclave to a pressure of 24 atmospheres. The polymerization was carried out for 16 hours under the conditions of temperature, pressure, etc. set forth in Example 2. The purified product obtained in a yield of 34 g. was a polyethylene of high molecular weight having a fusion point of 134° C.

EXAMPLE 5

An autoclave as described in Example 1 was swept with nitrogen and loaded with 5 cc. methylhydrogensiloxane (as identified in Example 1), 1.7 g. of $TiCl_4$, 0.5 cc. anhydrous methanol and 350 cc. benzine under nitrogen. This mixture was heated for 1 hour at 100° C. under autogenous pressure in the locked autoclave. Another 1.7 g. of $TiCl_4$ was then added at 100° C. and ethylene was forced into the auoclave up to 10 atmospheres pressure. The reaction mass was heated at 100° C. for 21 hours at 10 atmospheres pressure with intermittent addition of more ethylene to hold the reaction pressure at the prescribed level. The mass was cooled and the excess ethylene was vented off. The product polymer was a solid, brown polyethylene. This polymer was separated from the solvent and triturated in the presence of methanol. Purification as in Example 1 gave 71.5 g. of a white, high molecular weight polyethylene with a fusion point of 130° C.

EXAMPLE 6

An autoclave was loaded, as in Example 1, with 10 cc. methylhydrogenpolysiloxane (30 cs. at 25° C.), 5 cc. of tetrabutyltitanate [Ti(OBu)₄], and 350 cc. of benzine. The autoclave was closed and locked and the catalyst mass heated at 95° C. for 1 hour at which point a dark blue solution had formed. Ethylene was forced into the autoclave to a pressure of 50 atmospheres. The polymerization reaction, accompanied by further additions of ethylene, proceeded for 32 hours at 125° C. and 50 atmospheres pressure. The reaction mass was cooled to room temperature and excess ethylene was vented off. Purification of the product as in Example 1 gave 70 g. of white powdery polyethylene with a fusion point of 129° C.

EXAMPLE 7

Carrying out the procedure of Example 6 but under polymerization conditions of 125° C. and 10 atmospheres pressure for 24 hours, 20 g. of high molecular, powdery polyethylene with a fusion point of 131° C. was obtained.

EXAMPLE 8

An autoclave was loaded with 10 cc. methylhydrogenpolysiloxane, 5 cc. tetrabutyltitanate and 350 cc. benzine as in Example 6. Without preheating the catalyst mixture, ethylene is introduced into the locked autoclave to a pressure of 10 atmospheres. The mixture is heated to 125° C. and the pressure increased above 10 atmospheres during the first two hours of heating but thereafter additional ethylene was added to the reaction zone to maintain a reaction pressure of 10 atmospheres. 20.5 g. of white polyethylene having a fusion point of 130.5° C. was obtained by purification of the resulting polymeric product.

This procedure was repeated but heating was regulated so that the reaction pressure of 10 atmospheres was not exceeded. The resulting polymer had a fusion point of 130.5° C.

EXAMPLE 9

An autoclave was loaded with 12.5 cc. of methylhydrogensiloxane (30 cs.), 1 g. of TiCl₄, and 350 cc. of benzine under dry nitrogen. This mixture was heated in the closed autoclave for 1.5 hours at 105° C. The mixture was cooled to 25° C. and 250 g. of vinyl chloride mixed with an equal amount of nitrogen was forced into the autoclave. This mixture was heated to 65° to 73° C. for 22 hours at a pressure of 10.0 to 10.5 atmospheres. The mixture was cooled to 25° C. and the excess materials were vented off. A fine grained, gray to light brown polyvinylchloride was obtained. Upon separation and purification achieved by filtration and refluxing with ethanolic HCl, a yield of 69 g. of white high polymer was obtained. This polymer had a heat distortion temperature of 86° C., employing the Vikat method with a 5 kg. load and a Kundt's constant value of 46. The product had extraordinary thermal stability.

EXAMPLE 10

An autoclave was loaded with 12.5 cc. methylhydrogensiloxane (30 cs.), 1.7 g. TiCl₄, 10 cc. of a 10% solids in suspension of TiCl₃ and TiCl₂ in benzine wherein the TiCl₃/TiCl₂ ratio is 5.4/1, and 340 cc. of benzine (boiling range 150° to 180° C.,) under dry nitrogen. The mixture was heated to 110° C. for 2 hours in the locked autoclave. The mixture was cooled to 50° C. A mixture of ethylene and vinylchloride was forced into the autoclave to a pressure of 15 atmospheres. The mixture was then heated to 75° C. and 20 atmospheres for 33 hours with adidtional ethylene added to maintain the reaction pressure. The mixture was cooled and excess monomeric material was vented off. 30 g. of a brownish, solvent saturated polymeric material was obtained and was separated and purified as in Example 1. A good yield of a yellow copolymer was achieved. The chlorine content of the copolymer indicates that it contains 89 mol percent polyvinylchloride and 11 mol percent polyethylene.

That which is claimed is:

1. A method of preparing a catalyst system for use in polymerization reactions of olefinic compounds consisting of admixing component (A) an organohydrogensiloxane polymer consisting essentially of units of the formula

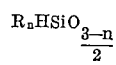

where $n$ has a value from 0 to 3 inclusive and each R is selected from the group consisting of hydrogen atoms, alkyl radicals, cycloalkyl radicals, aryl radicals, alkoxy radicals, cycloalkoxy radicals, aryloxy radicals and halogenated, alkoylated and hydroxylated derivatives of the foregoing radicals with component (B) a compound of a metal selected from the group consisting of oxyhalides, acetyl acetonates, hydrocarbon esters and dicyclopentadienyl compounds of Ti, Zr, Hf, Th, V, Nb, Ta, Cr, Mo, W and U.

2. The method of claim 1 further characterized in that the catalyst system contains at least 0.5 mol of the defined organohydrogensiloxane polymer (A) per mole of the defined compounds of a metal (B).

3. The method of claim 1 further characterized in that the mixture of components (A) and (B) is heated in the temperature range of 60° to 150° C. for 1 to 2 hours before being employed in the polymerization reaction.

4. The method of claim 1 further characterized in that the mixture of components (A) and (B) is heated in the temperature range of 90° to 110° C. for 1 to 2 hours before being employed in the polymerization reaction.

5. The method of claim 1 further characterized in that the organohydrogensiloxane polymer (A) is a methylhydrogensiloxane polymer.

6. A method of preparing a catalyst system for use in polymerization reactions of olefinic compounds consisting of (I) admixing component (A) an organohydrogensiloxane polymer of units of the formula

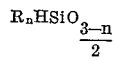

where $n$ has a value from 0 to 3 inclusive and each R is selected from the group consisting of hydrogen atoms, alkyl radicals, cycloalkyl radicals, aryl radicals, alkoxy radicals, cycloalkoxy radicals, aryloxy radicals and halogenated, alkoxylated and hydroxylated derivatives of the foregoing radicals with component (B) a compound of a metal selected from the group consisting of oxyhalides, acetyl acetonates, hydrocarbon esters and dicyclopentadienyl compounds of Ti, Zr, Hf, Th, V, Nb, Ta, Cr, Mo, W and U, said components being present in molar ratio of at least ½ mol of organohydrogen siloxane (A) per mole of the compound of a metal (B), and therafter (II) heating the mixture from (I) in the temperature range from 60° to 150° C. for 1 to 2 hours.

7. The method of claim 6 wherein the heating of components (A) and (B) is carried out in the presence of (C) an aliphatic alcohol which is present to the extent of 1 to 20 percent based on the weight of component (B) in the mixture.

8. The method of claim 7 wherein the catalyst system also contains (D) .001 to 100 percent based on the weight of component (B) of a compound selected from the group consisting of TiCl₃, TiCl₂, VCl₃, CrCl₂, AlCl₃ and ZnCl₂.

9. The method of claim 8 further characterized in that an equal weight of component (B) is added to the catalyst mass after it has been heated.

10. A method of polymerizing an olefinic monomer consisting essentially of contacting said monomer with a catalyst system at a pressure of 1 to 100 atmospheres and a temperature of 30° to 200° C. said catalyst system comprising a product prepared by mixing component (A)

an organohydrogensiloxane polymer consisting essentially of units of the formula

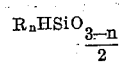

where $n$ has a value from 0 to 3 inclusive and each R is selected from the group consisting of hydrogen atoms, alkyl radicals, cycloalkyl radicals, aryl radicals, alkoxy radicals, cycloalkoxy radicals, aryloxy radicals and halogenated, alkoxylated and hydroxylated derivatives of the foregoing radicals and component (B) a compound of a metal selected from the group consisting of oxyhalides, acetyl acetonates, hydrocarbon esters and dicyclopentadienyl compounds of Ti, Zr, Hf, Th, V, Nb, Ta, Cr, Mo, W and U.

11. The method of claim 10 wherein the catalyst system contains at least 0.5 mol of the defined organohydrogensiloxane polymer (A) per mol of the defined compounds of metals (B).

12. The method of claim 10 further characterized in that the mixture of components (A) and (B) is heated in the temperature range of 60° to 150° C. for 1 to 2 hours before being employed in the polymerization reaction.

13. The method of claim 10 further characterized in that the mixture of components (A) and (B) is heated in the temperature range of 90° to 110° C. for 1 to 2 hours before being employed in the polymerization reaction.

14. The method of claim 10 further characterized in that the organohydrogensiloxane polymer (A) is a methylhydrogensiloxane polymer.

15. A method of polymerizing an olefinic monomer consisting essentially of contacting said monomer with a catalyst system at a pressure of 1 to 100 atmospheres and at a temperature of within the range 30° to 200° C. said catalyst system comprising a product prepared by (I) admixing component (A) an organohydrogensiloxane polymer of units of the formula

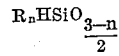

where $n$ has a value from 0 to 3 inclusive and each R is selected from the group consisting of hydrogen atoms, alkyl radicals, cycloalkyl radicals, aryl radicals, alkoxy radicals, cycloalkoxy radicals, aryloxy radicals and halogenated, alkoxylated and hydroxylated derivatives of the foregoing radicals with component (B) a compound of a metal selected from the group consisting of oxyhalides, acetyl acetonates, hydrocarbon esters and dicyclopentadienyl compounds of Ti, Zr, Hf, Th, V, Nb, Ta, Cr, Mo, W and U, said components being present in molar ratio of at least ½ mol of organohydrogensiloxane (A) per mol of the compound of a metal (B), and thereafter (II) heating the mixture from (I) in the temperature range from 60° to 150° C. for 1 to 2 hours.

16. The method of claim 15 wherein the heating of components (A) and (B) is carried out in the presence of (C) an aliphatic alcohol which is present to the extent of 1 to 20 percent based on the weight of component (B) in the mixture.

17. The method of claim 16, wherein the catalyst system also contains (D) .001 to 100 percent based on the weight of component (B) of a compound selected from the group consisting of $TiCl_3$, $TiCl_2$, $VCl_3$, $CrCl_2$, $AlCl_3$ and $ZnCl_2$.

18. The method of claim 17 further characterized in that an equal weight of component (B) is added to the catalyst mass after it has been heated.

19. The method of claim 15 wherein the organohydrogensiloxane polymer is a methylhydrogensiloxane.

20. The method of claim 10 wherein the catalyst system is employed in an organic solvent which is inert to the reactants.

21. The method of claim 17 wherein the organohydrogensiloxane polymer is a methylhydrogensiloxane.

22. The method of claim 18 wherein the organohydrogensiloxane polymer is a methylhydrogensiloxane.

23. The method of claim 10 wherein the olefinic monomer and the catalyst system are admixed and heated without pre-preparation of the catalyst system.

24. The method of claim 1 wherein the compound of a metal (B) is vanadium oxychloride.

25. The method of claim 6 wherein the compound of a metal (B) is vanadium oxychloride.

26. The method of claim 7 wherein the compound of a metal (B) is vanadium oxychloride.

27. The method of claim 8 wherein the compound of a metal (B) is vanadium oxychloride.

28. The method of claim 9 wherein the compound of a metal (B) is vanadium oxychloride.

29. The method of claim 10 wherein the compound of a metal (B) is vanadium oxychloride.

References Cited by the Examiner

UNITED STATES PATENTS

| | | | |
|---|---|---|---|
| 2,341,286 | 2/44 | Pines et al. | 260—429 |
| 2,441,214 | 5/48 | Thomas et al. | 260—429 |
| 2,832,759 | 4/58 | Nowlin et al. | 260—94.9 |
| 2,840,551 | 6/58 | Field et al. | 260—93.7 |
| 2,908,593 | 10/59 | Naidus | 260—46.5 |

FOREIGN PATENTS

| | | |
|---|---|---|
| 554,242 | 2/57 | Belgium. |
| 785,314 | 10/57 | Great Britain. |

JOSEPH L. SCHOFER, *Primary Examiner.*

HAROLD N. BURSTEIN, MILTON STERMAN, MORRIS LIEBMAN, *Examiners.*